United States Patent [19]
Wang

[11] Patent Number: 5,662,538
[45] Date of Patent: Sep. 2, 1997

[54] DEVICE FOR ADJUSTING PITCH DIAMETER OF SHEAVE OF VARIABLE SPEED MECHANISM

[76] Inventor: Fue-Jye Wang, No. 29-20, Dong-Tsuen Road, Taiping, Taichung Hsien, Taiwan

[21] Appl. No.: 614,975

[22] Filed: Mar. 11, 1996

[51] Int. Cl.⁶ ............................................ F16H 59/00
[52] U.S. Cl. ..................... 474/11; 474/38; 474/40; 474/103
[58] Field of Search ............................ 474/102, 103, 474/11, 18, 20, 24, 29, 38–40

[56] References Cited

U.S. PATENT DOCUMENTS

| | | | |
|---|---|---|---|
| 3,628,115 | 12/1971 | Pruitt | 318/345 |
| 4,698,048 | 10/1987 | Rundle | 474/27 |
| 4,740,191 | 4/1988 | Takano et al. | 474/11 |
| 5,290,205 | 3/1994 | Densmore et al. | 482/54 |
| 5,334,105 | 8/1994 | Wang | 474/69 |

*Primary Examiner*—Roger J. Schoeppel
*Attorney, Agent, or Firm*—Browdy and Neimark

[57] ABSTRACT

A device for adjusting the sheave pitch diameter of a variable speed mechanism includes an output shaft, a linking member, an upper urging rod, a lower urging rod, and a motor. The device can be operated easily and safely such that the speed changing information is quantified and displayed.

12 Claims, 3 Drawing Sheets

5,662,538

DEVICE FOR ADJUSTING PITCH DIAMETER OF SHEAVE OF VARIABLE SPEED MECHANISM

BACKGROUND OF THE INVENTION

The present invention relates generally to a variable speed mechanism, and more particularly to a device for adjusting the sheave pitch diameter of a variable speed mechanism.

The inventor of the present invention discloses in the U.S. Pat. No. 5,334,105. A device comprises an adjusting button 24 which is attached to a side of the first variable speed belted wheel 21 for use in adjusting the pitch diameter of the wheel groove of the wheel 21.

Such a prior art adjusting means as described above is limited in design in that it is incapable of expressing explicitly the extent of the speed changing situation in quantitative terms and by the use of a display.

SUMMARY OF THE INVENTION

It is therefore the primary objective of the present invention to provide a device for adjusting the sheave pitch diameter of a variable speed mechanism. The device can be operated easily such that the speed changing information is quantified and displayed.

The features of the present invention will be more readily understood upon a thoughtful deliberation of the following detailed description of an embodiment of the present invention in conjunction with the accompanying drawings.

DETAILED DESCRIPTION OF THE EMBODIMENT

Figure 1:
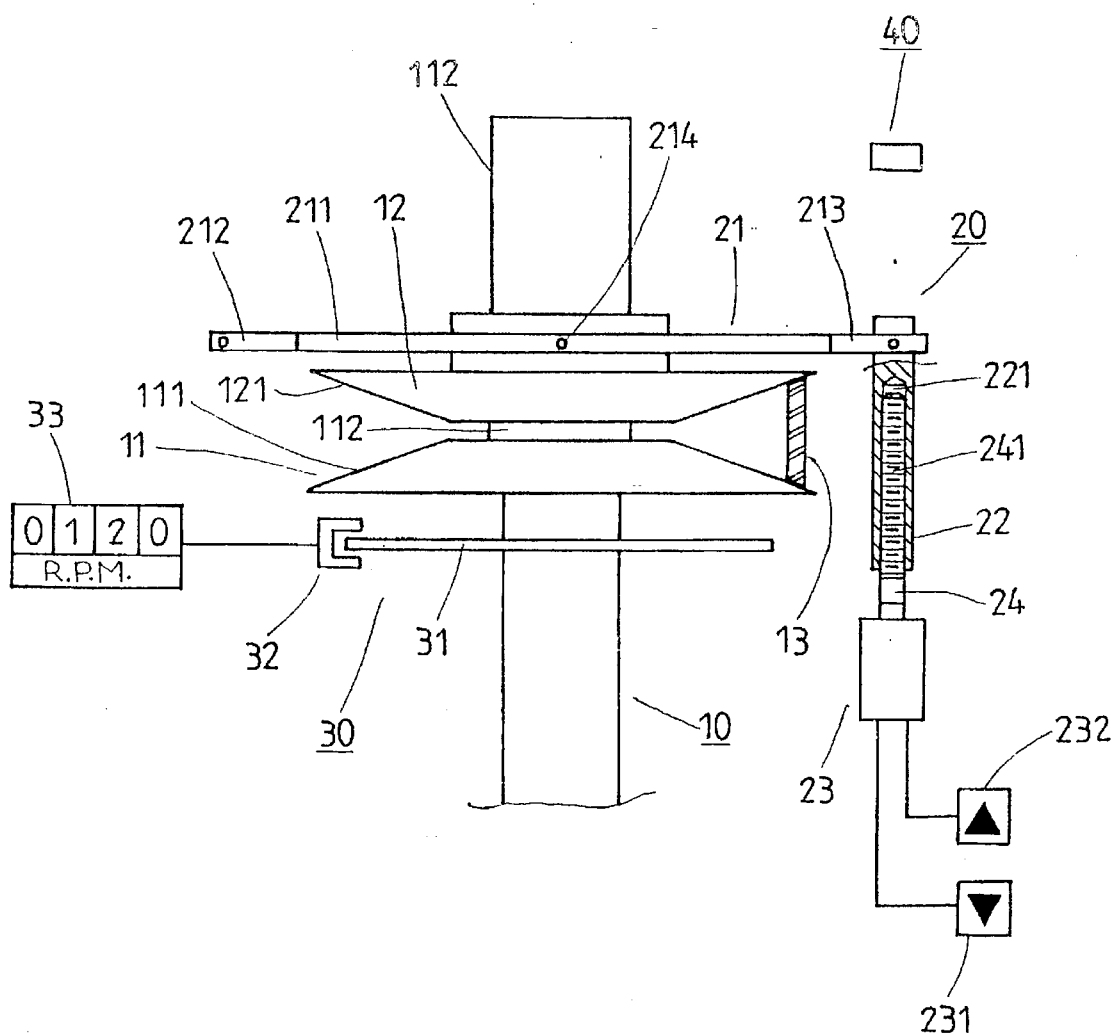
FIG. 1 is a schematic view of the embodiment of the present invention.
Figure 2:
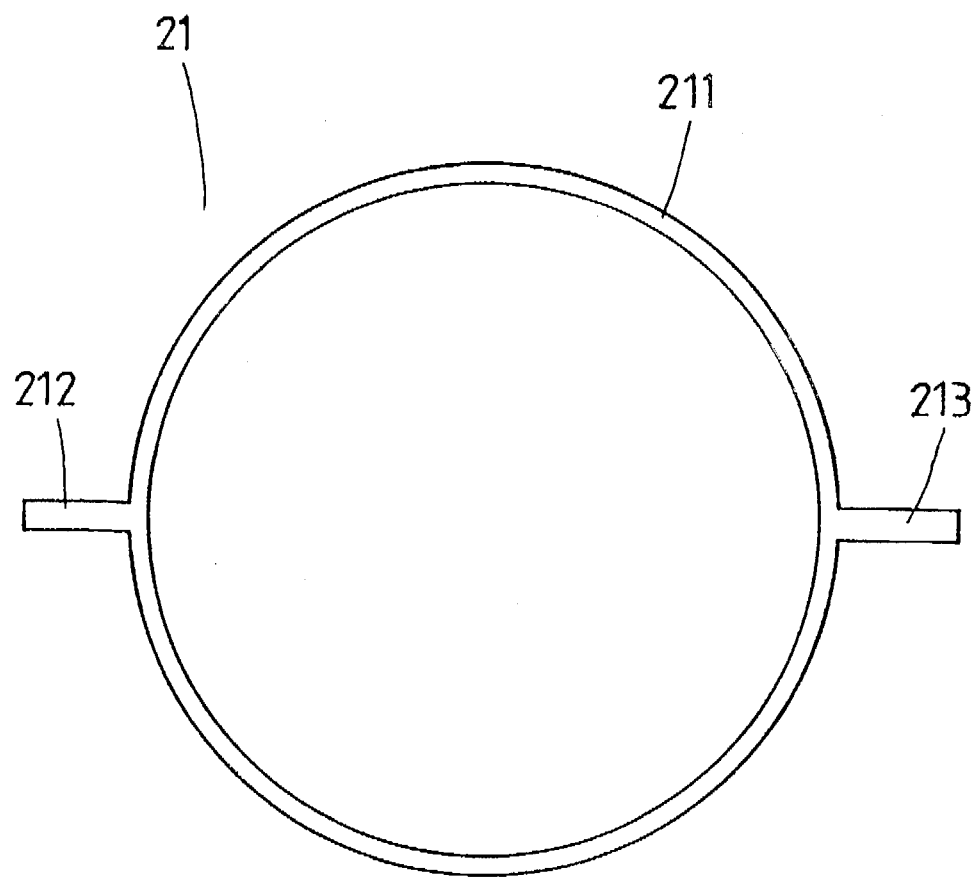
FIG. 2 is a top plan view of the linking member of the embodiment as shown in FIG. 1.
Figure 3:
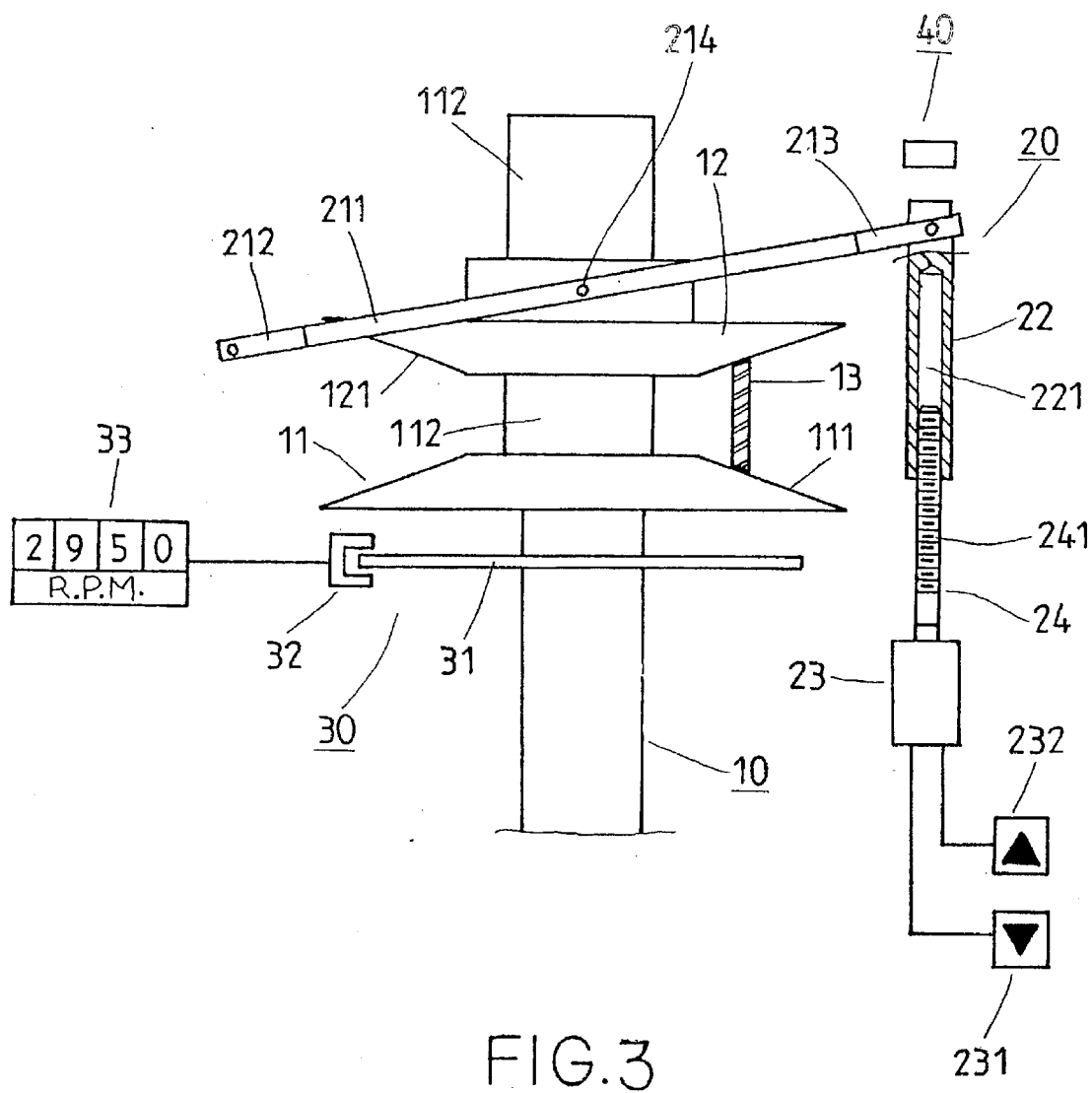
FIG. 3 is a schematic view of the present invention at work.

Referring now to FIGS. 1–3, a preferred embodiment according to the present invention includes an output shaft 10, a height adjusting device 20, a revolution detecting unit 30 and a position limiting device 40.

The output shaft 10 is disposed such that it is parallel to an input shaft (not shown in the drawings) or other intermediate shaft (not shown in the drawings). The output shaft 10 is provided with a fixed wheel member 11 which has a lower tapered portion 111 facing inwards and upwards. The output shaft 10 is further provided at the upper segment thereof with a shaft tube portion 112 on which a movable wheel member 12 is fastened pivotally in such a manner that the movable wheel member 12 can be moved up and down. The movable wheel member 12 has an upper tapered portion 121 which is slanted from the upper side toward the lower side of the inside for mounting a belt 13 in conjunction with the lower tapered portion 111.

The height adjusting device 20 is intended for adjusting the height of the movable wheel member 12 and is composed of a linking member 21, an upper urging rod 22, a motor 23, and a lower urging rod 24. The linking member 21 has a round framelike midsegment 211 provided peripherally with a first rod 212 and a second rod 213 opposite in location to the first rod 212. The midsegment 211 is fastened pivotally with the movable wheel member 12 by means of a bolt 214 such that the first rod 212 is pivoted at the outer end thereof with a fixation point. The upper urging rod 22 is pivoted at the upper end thereof with the outer end of the second rod 213 of the linking member 21. The upper urging rod 22 is provided with an inner threaded hole 221 extending upwards from the underside thereof. The motor 23 is located securely at a predetermined point and is provided with a forward revolution switch 231 and a reverse revolution switch 232. The lower urging rod 24 is fastened with the rotary shaft of the motor 23 and is provided with a male threaded portion 241 for a rightward rotation. The male threaded portion 241 is engaged with the inner threaded hole 221 of the upper urging rod 22.

The revolution detecting unit 30 comprises a disk member 31 which is mounted on the output shaft 11 such that the disk member 31 is actuated to turn synchronously with the output shaft 11. The revolution detecting unit 30 further comprises a detector 32 and a display 33. The detector 32 is used to detect the RPM (revolution per minute) of the disk member 31 while the display 33 is intended to exhibit the detected RPM.

The position limiting device 40 is mounted securely at a predetermined point for limiting the highest point that the upper urging rod 22 can be lifted and for allowing the inner threaded hole 221 to remain engaged with the male threaded portion 241 when the upper urging rod 22 has reached the highest point. The present invention is provided with a microswitch which is connected with the motor 23.

In operation, when the reverse revolution switch 232 of the motor 23 is pressed, the upper urging rod 22 is urged upwards when the lower urging rod 24 is caused to turn at its original position. As a result, the linking member 21 is actuated by the upper urging rod 22 to displace radially by its first rod 212, with the outer end of the first rod 212 serving as a fulcrum. The midsegment 211 of the linking member 21 is fastened pivotally with the movable wheel member 12. The movable wheel member 12 is therefore able to displace radially along with the linking member 21 so as to move upwards gradually. The pitch diameter of the belt 13 between the movable wheel member 12 and the fixed wheel member 11 becomes smaller gradually. If the top of the upper urging rod 22 touches the position limiting device 40, the motor 23 is stopped by the position limiting device 40 so as to ensure that the inner threaded hole 221 does not become disengaged with the male threaded portion 241. On the contrary, if the operator desires to increase the pitch diameter of the belt 13 between the movable wheel member 12 and the fixed wheel member 13, the forward revolution switch 231 of the motor 23 should be pressed to allow the upper urging rod 22 to be pulled downwards so as to actuate the movable wheel member 12 to move downwards to become closer to the fixed wheel member 11.

When the operation is under way, the revolution per minute of the output shaft 10 is displayed by the revolution detecting unit 30. As soon as the desired revolution per minute of the output shaft 10 is shown by the display 33, the operator should stop pressing the forward revolution switch button or the reverse revolution switch button of the motor 23 so as to cause the upper urging rod 22 to stop rising and descending. As a result, the movable wheel member 12 is held at a predetermined point at which a predetermined revolution per minute is attained.

In practice, the forward revolution switch 231 and the reverse revolution switch 232 of the motor 23, the display 33 of the revolution detecting unit 30 can be mounted on the control panel. In the prior art device, it is necessary to open the cover of the speed changing wheel box to rotate the adjusting button 24 so as to adjust the shears pitch diameter. The device of the present invention is easy and safe to use, without subjecting the operator to the risk of the bodily injury caused by the speed changing wheel members in motion.

The embodiment of the present invention described above is to be regarded in all respects as being merely illustrative and not restrictive. The present invention can be therefore embodied in other specific forms without deviating from the spirit thereof. For example, the inner threaded hole of the upper urging rod 22 may be replaced with a male threaded portion while the male threaded portion of the lower urging rod 24 may be replaced with an inner threaded hole. The present invention is therefore to be limited only by the scopes of the following appended claims.

What is claimed is:

1. A device for adjusting sheave pitch diameter of a variable speed mechanism comprising:

an output shaft fastened with a fixed wheel member provided with a movable wheel member capable of moving up and down in relation to said fixed wheel member for changing a pitch diameter of a belt engaging said fixed wheel member and said movable wheel member;

a linking member having a midsegment, a first rod extending from one end of said midsegment and a second rod extending from another end of said midsegment, with said midsegment being fastened pivotally with said movable wheel member, and with said first rod being fastened pivotally at one end thereof with a predetermined point;

an upper urging rod fastened pivotally at one end thereof with said second rod and provided with an inner threaded hole;

a motor mounted securely at a predetermined point and provided with a forward revolution switch and a reverse revolution switch; and a lower urging rod fastened with a rotary shaft of said motor and provided with a male threaded portion engaging said inner threaded hole of said upper urging rod.

2. A device according to claim 1, wherein said upper urging rod is provided with a position limiting device for limiting an ultimate height at which said upper urging rod can be lifted.

3. A device according to claim 2, wherein said position limiting device is a microswitch.

4. A device according to claim 1, wherein said output shaft is provided with a revolution detecting unit, which comprises:

a disk member fastened with said output shaft; a detector mounted by said disk member for detecting a revolution per minute of said disk member; and a display for exhibiting a revolution per minute of said output shaft.

5. A device according to claim 1, wherein said midsegment of said linking member is of a round framelike construction.

6. A device according to claim 4, wherein said upper urging rod is provided with a position limiting device for limiting an ultimate height at which said upper urging rod can be lifted.

7. A device according to claim 6, wherein said position limiting device is a microswitch.

8. A device for adjusting sheave pitch diameter of a variable speed mechanism comprising:

an output shaft fastened with a fixed wheel member provided with a movable wheel member capable of moving up and down in relation to said fixed wheel member for changing a pitch diameter of a belt engaging said fixed wheel member and said movable wheel member;

a linking member having a midsegment, a first rod extending from one end of said midsegment and a second rod extending from another end of said midsegment, with said midsegment being fastened pivotally with said movable wheel member, and with said first rod being fastened pivotally at one end thereof with a predetermined point;

an upper urging rod fastened pivotally at one end thereof with said second rod and provided with a male threaded portion;

a motor mounted securely at a predetermined point and provided with a forward revolution switch and a reverse revolution switch; and a lower urging rod fastened with a rotary shaft of said motor and provided with an inner threaded hole engaging said male threaded portion of said upper urging rod.

9. A device according to claim 8, wherein said upper urging rod is provided with a position limiting device for limiting an ultimate height at which said upper urging rod can be lifted.

10. A device according to claim 9, wherein said output shaft is provided with a revolution detecting unit, which comprises:

a disk member fastened with said output shaft;

a detector mounted by said disk member for detecting a revolution per minute of said disk member; and a display for exhibiting a revolution per minute of said output shaft.

11. A device according to claim 10, wherein said position limiting device is a microswitch.

12. A device according to claim 11, wherein said midsegment of said linking member is of a round framelike construction.

* * * * *